United States Patent [19]

Anthony

[11] Patent Number: 4,897,241

[45] Date of Patent: Jan. 30, 1990

[54] ANTI-BOW GRID FOR NUCLEAR FUEL ASSEMBLY

[75] Inventor: Andrew J. Anthony, Tariffville, Conn.

[73] Assignee: Combustion Engineering, Inc., Windsor, Conn.

[21] Appl. No.: 825,948

[22] Filed: Feb. 3, 1986

Related U.S. Application Data

[63] Continuation of Ser. No. 325,712, Nov. 30, 1981, abandoned.

[51] Int. Cl.[4] .................................................. G21C 3/34
[52] U.S. Cl. ........................................ 376/438; 376/448
[58] Field of Search ............... 376/438, 462, 448, 441, 376/442, 439

[56] References Cited

U.S. PATENT DOCUMENTS

| | | | |
|---|---|---|---|
| 3,255,091 | 6/1966 | Frisch | 376/441 |
| 3,389,056 | 6/1968 | Frisch | 376/434 X |
| 3,751,335 | 8/1973 | Keith | 376/442 |
| 3,853,701 | 12/1974 | Sasaki et al. | 376/448 X |
| 3,929,569 | 12/1975 | Piepers et al. | 376/441 |
| 3,994,779 | 11/1976 | Brayman et al. | 376/442 |
| 4,021,300 | 5/1977 | Marshall et al. | 376/462 |
| 4,059,483 | 11/1977 | Anthony | 376/442 |
| 4,142,934 | 3/1979 | Wild | 376/448 X |
| 4,221,636 | 9/1980 | Feateal | 376/441 |
| 4,224,107 | 9/1980 | Delafosse et al. | 376/442 X |
| 4,295,935 | 10/1981 | Anthony | 376/462 |
| 4,304,635 | 12/1981 | Lippert et al. | 376/448 |
| 4,306,938 | 12/1981 | Yamanako | 376/448 |
| 4,325,786 | 4/1982 | Wohlsen | 376/462 X |
| 4,351,795 | 9/1982 | Nicholson | 376/442 |
| 4,474,730 | 10/1984 | Hellman et al. | 376/462 |

FOREIGN PATENT DOCUMENTS

| | | | |
|---|---|---|---|
| 0992021 | 5/1965 | United Kingdom | 376/434 |
| 1425252 | 2/1976 | United Kingdom | 376/442 |
| 1517670 | 7/1978 | United Kingdom | 376/442 |
| 2022909 | 12/1979 | United Kingdom | 376/442 |

Primary Examiner—Daniel Wasil
Attorney, Agent, or Firm—John H. Mulholland

[57] ABSTRACT

An inproved grid (16) for a nuclear fuel assembly (10), having a plurality of externally projecting, integrally formed anti-bowing springs (50) spaced about the grid perimeter plate (26), for interacting with flat surfaces (52') on the opposite grids (16') of adjacent assemblies (10'). The anti-bowing springs (50) are horizontally separated along each grid (26) in periodic alternation with substantially flat portions (52) of the perimeter plate (26). Preferably, each grid has a plurality of primary anti-bowing springs (70) that project a distance at least equal to the nominal gap (g) between assemblies, and a plurality of secondary anti-bowing springs (72) that are stiffer but project less than the primary springs. Also, backup springs (74) are disclosed as integrally formed ridges adjacent to the anti-bowing springs. The interaction of each grid (16) with its neighbor (16') "tightens" the core during power operation and provides an anti-bowing effect.

10 Claims, 3 Drawing Sheets

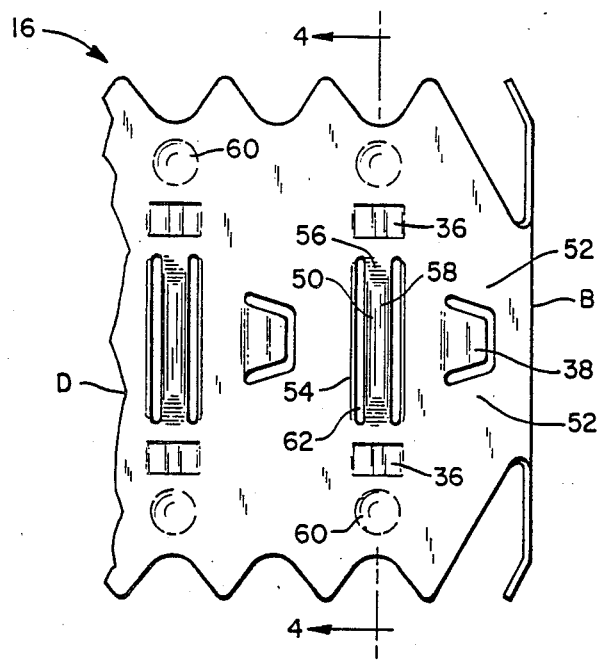
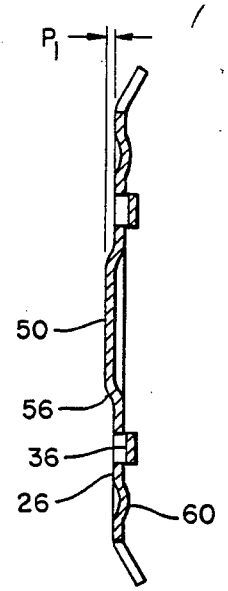
FIG. 3
FIG. 4
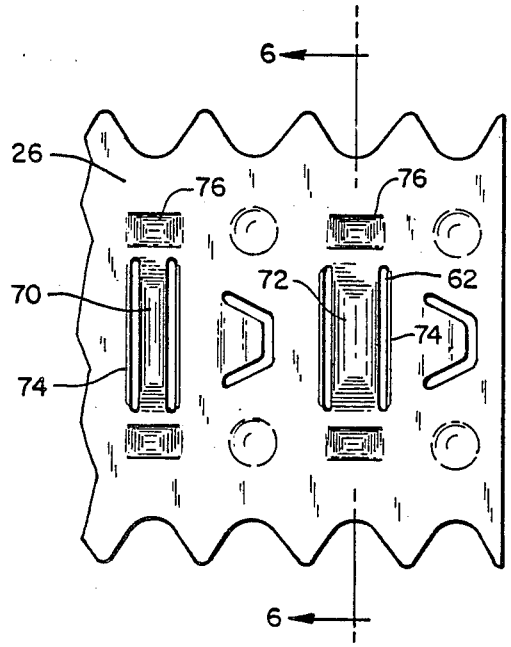
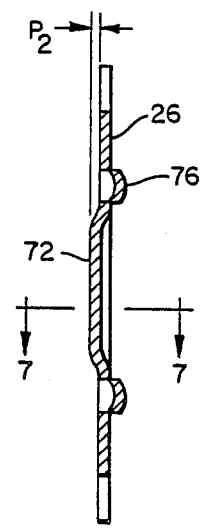
FIG. 5
FIG. 6

ANTI-BOW GRID FOR NUCLEAR FUEL ASSEMBLY

This application is a continuation of application Ser. No. 325,712, filed 11/30/81, now abandoned.

BACKGROUND OF THE INVENTION

The present invention relates to fuel assemblies for nuclear reactors, and in particular to structure carried by the assemblies for maintaining proper inter-assembly spacing and alignment.

The nuclear reactor core of a pressurized water power reactor typically consists of a multiplicity of elongated, square fuel assemblies, each containing a square array of some two hundred individual fuel rods. The rods are supported in the assembly by a plurality of longitudinally spaced, transversely oriented grids which in turn are affixed to rigid, longitudinally extending tubes or columns. These support tubes are secured in end fittings which are seated directly or indirectly to support plates connected to the reactor vessel. A major objective of this fuel arrangement is to maintain proper spacing between individual fuel rods within each assembly, and between the assemblies.

Various normal conditions occur during core operation which alter the as-built, nominal spacings. One obvious condition is coolant temperature, which typically varies from a spatially uniform value of about 100° F. (38° C.) during refueling, to a spatially varying value in the range, for example, of 560° F.–620° F. (293° C. to 326° C.). In reactors using a steel vessel and support plates, and substantially all-Zircaloy fuel assemblies, a difference in coefficient of thermal expansion introduces a spatial dependence on the fuel assembly spacing. Another normally present effect is the dimensional change in the assemblies with time, as a result of irradiation-induced creep and growth. These temperature and irradiation effects have been accommodated to a tolerable degree with careful design and manufacturing.

Other conditions, however, have been found to require additional attention and have posed problems less amenable to easy solution, particularly in cores having all-Zircaloy assemblies. For example, the core must be capable of withstanding the load imposed by hypothesized seismic disturbances which, being primarily in the lateral direction, could cause assemblies to impact and damage one another. Therefore, to reduce impact loading, the prior art has, to a large extent, found it desirable to minimize the interassembly spacing during reactor power operation, yet provide adequate clearance to permit removal and rearrangement of assemblies during refueling. A commonly proposed technique uses bimetallic structures carried by or acting against the fuel assemblies to provide a "tighter" core during power production than during refueling. One such example is shown in U.S. No. 4,059,483 "Nuclear Fuel Assembly Seismic Amplitude Limiter," where the midplane of every assembly carries a stainless steel "seismic grid" rather than a conventional all-Zircaloy spacer grid.

Recently, another operating condition known as fuel assembly bowing has been observed. Bowing produces a pronounced, permanent curvature in the intermediate portions of the fuel assemblies, which worsens as burnup increases during a fuel cycle. When accumulated over several assemblies across the core midplane, bowing may impair the neutronics-related safety margins during power operation, and impede fuel assembly removal or replacement during refueling outages.

Although some of the prior art fuel assembly designs intended for use in areas of high seismic activity might, to some extent, incidentally reduce the adverse effects of bowing, they are deficient in several respects, especially when used in all-Zircaloy fuel assemblies:

1. Most rely on bi-metallic structure, which is expensive to fabricate and usually introduces unwanted, strongly neutron absorbingmaterial in the core.
2. The applied inter-assembly forces are either too weak, or effective over insufficient area, to adequately counteract the bowing forces.
3. The burnup dependence of the bowing phenomenon is not adequately accounted for.

If the spacing between assemblies is simply reduced to a value where bowing is limited to an acceptable value not only is there difficulty in initial fuel assembly loading but because of irradiation growth of grids as a function of time (burnup) it is likely that the core could be "locked up" so that fuel removal would be extremely difficult. Therefore what is required is a grid which provides the desired close spacing between fuel assemblies, but which is resilient enough to account for irradiation induced grid growth and normal refueling loads.

SUMMARY OF THE INVENTION

Accordingly, it is an object of the present invention to provide a fuel assembly which overcomes these deficiencies, and which can be easily fabricated and readily inserted into existing pressurized water reactors. The present invention provides a fuel assembly having easily fabricated, integral structures thereon to cooperate with adjacent assemblies in the reactor core, for counteracting and nullifying the bowing forces arising in the core. There are also provided multiple and redundant means to strengthen the anti-bowing measures as the bowing forces increase during the burnup cycle.

These and other advantages especially beneficial with all-Zircaloy fuel assemblies, are provided by a novel grid on each fuel assembly, having a plurality of externally projecting, integrally formed anti-bowing springs thereon spaced about the grid outer surface, for interacting with flat surfaces on the opposite grids of adjacent assemblies. In one embodiment, the anti-bowing springs are all of the same, or primary, type. The primary spring projection is preferably sufficient to load the spring when the assembly is first inserted into the core. As the core heats up to power, the inter-assembly gap typically increases due to the different expansion coefficients for the core support plate and the all-Zircaloy fuel assemblies. Thus, upon core heatup, the primary springs are slightly unloaded, but continue to occupy the inter-assembly gap at regular intervals around the entire grid perimeter and thereby inhibit bowing early in the fuel cycle. During the burnup cycle the irradiation-induced behavior of the Zircaloy grids tends to decrease the inter-assembly gap. However, when the springs make contact with adjacent surfaces, an irradiation induced creep phenomena is also present in the springs which tends to decrease spring projection inelastically as a function of time. The overall effect loosens the lateral restraint throughout the core, with a consequent initiation of some degree of bowing in some regions of the core. The nuclear related margins however are not imparied and refueling may proceed at the end of cycle.

In the case of non-Zircaloy anti bow grids, e.g., AM 350 or Inconel, both the growth and creep phenomena are significantly less than that of Zircoloy grids, hence fuel assembly bowing can be nearly eliminated.

In another embodiment of the invention, secondary anti-bowing springs are alternated with the primary springs around the perimeter of the grid. The secondary springs are stiffer and have a shorter projection. Therefore they do not come in contact with the respective opposite flat surface until well into the burnup cycle when bowing forces may overcome the primary springs.

Backup springs may also be provided to resist bowing forces should they unexpectedly overcome the primary and secondary springs. In one embodiment, very stiff backup springs are formed as ridges on the grid plate, projecting parallel with an adjacent to the anti-bowing springs for interacting on substantially the same flat surface on the opposite grid, as the anti-bowing springs. The backup springs also provide the stiff buffer between assemblies required of special seismic grids, and accordingly eliminate the need for separate seismic grids. Back up springs also serve as amplitude limiting devices for the primary and secondary springs during a seismic event such that the deflection of primary and secondary springs remains elastic.

BRIEF DESCRIPTION OF THE DRAWINGS

The best mode for carrying out the invention is fully described hereinbelow and in the accompanying drawings, in which:

FIG. 3 is an elevation view of a portion of one of the grids shown in FIG. 2, along the sight line 3.

FIG. 4 is a section of the grid taken along the line 4—4 of FIG. 3, showing the projections of the primary anti-bowing spring from the outer surface of the grid perimeter plate.

FIG. 5 is an elevation view of a portion of a grid according to an alternative embodiment of the invention, wherein primary and secondary anti-bowing springs having different dimensions are employed.

FIG. 6 is a section view through the secondary spring along line 6—6 of FIG. 5, showing the details thereof including the vertical crowning.

DESCRIPTION OF THE PREFERRED EMBODIMENTS

Figures 1, 1A, 2:
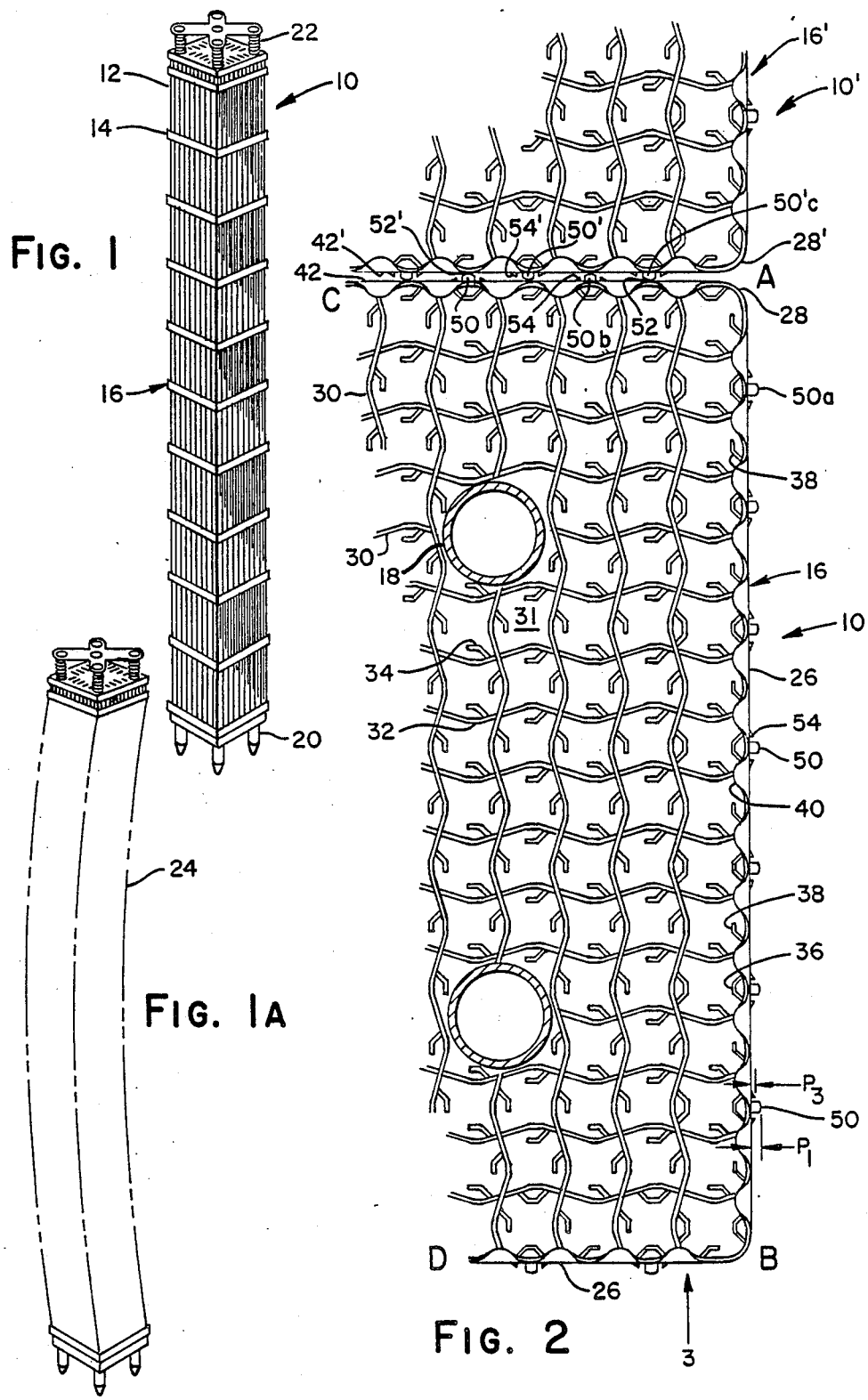
FIGS. 1 and 1A are schematic views of a typical pressurized water reactor fuel assembly showing a plurality of longitudinally spaced grids and, in an exaggerated, phantom representation, the effect of bowing thereon.
FIG. 2 is a partial plan view of two oppositely disposed grids in accordance with the present invention, located at the approximate midplane of two adjacent assemblies in a nuclear reactor core, with the fuel rods ommitted for clarity.

FIGS. 1 and 2 show a typical fuel assembly 10 for a pressurized water nuclear power reactor, including a multiplicity of elongated fuel rods 12 spaced and supported in a square array by a plurality of longitudinally separated spacer grids 14 including one grid 16 at substantially the assembly midplane. As shown in FIG. 2, the grids 14, 16 consist of interlaced strips forming an egg crate-type structure which provides openings through which the fuel rods traverse the grids. The grids 14, 16 are affixed to support tubes 18 which extend longitudinally through the fuel assembly and are connected to lower end fittings 20 and upper end fittings 22 at the extremities of the fuel assembly. The grids 14, 16, support tubes 18, and lower and upper end fitting 20, 22 are the structural frame of the assembly 10.

In one commonly used pressurized water reactor core, the entire fuel assembly metallic structure, except for the end fittings 20, 22, is made from Zircaloy, a material which is relatively transparent to thermal neutrons. The end fittings 20, 22 are typically made of less costly, but neutronically less desirable, stainless steel. The end fittings 20, 22 are adapted to engage upper and lower stainless steel core support plates (not shown) in the nuclear reactor vessel whereby the multiplicity of fuel assemblies may be arranged in a closely packed array to form the nuclear reactor core.

Recently, it has been observed during the refueling of reactor cores, that some burned fuel assemblies have developed a permanent deformation resembling a bow. This bow is represented, with great exaggeration, by the phantom lines 24 in FIG. 1A. Usually, bowing develops as a curvature of the intermediate portion of the fuel assembly with a slight bias towards the upper portion of the fuel assembly. Since every fuel assembly 10 has its extremities 20, 22 secured to rigid core support structure, the assembly midplane is most vulnerable to lateral forces that may develop as a result of flow or other asymmetries in the core. The forces giving rise to bowing act over a wide area of the core and can produce very large assembly deformations at the core boundary when the bowing of several assemblies accumulates in one direction.

According to the present invention, the entire core midplane is maintained in a somewhat "tight" condition throughout the burnup cycle to inhibit significant bowing. Since the spacing between adjacent fuel assemblies is maintained in the presence of high bowing forces, the individual assembly deformation is limited. Bowing of individual assemblies does not accumulate sufficiently to significantly deform the entire core.

In a typical fuel assembly 10 of the type represented in FIGS. 1 and 2, each grid 14, 16 has a nominal, cold outer dimension of 8.14 inches square (20.6 cm). The nominal clearance, or gap, between the grids of adjacent fuel assemblies in the core is about 0.045 inch (0.113 cm). Four substantially flat perimeter plates 26 are welded at their ends 28 to form the rectangular perimeter of the grids 14, 16. In the illustrated embodiment, fifteen vertical and fifteen horizontal grid strips 30 are interlaced to define openings 31 through which the fuel rods 12 traverse the grids. The strips defining each opening include at least one arch 32 and spring tab 34, and the inside surface 40 of the perimeter plate 26 includes corresponding arches 36 and spring tabs 38 for spacing and supporting the fuel rods 12.

FIG. 2 also shows an adjacent assembly 10' including midplane grid 16' at the same elevation on the assembly as grid 16 is with respect to assembly 10. Arbitrarily chosen, oppositely facing grid outer surfaces 42, 42' are coextensive and include, according to the present invention, a plurality of laterally spaced projections including primary springs 50, 50' and backup springs 54, 54'. It may be seen that each primary spring 50 on grid 16 is in contact with a substantially flat portion 52' on the outer surface 42' of grid 16', and similarly the primary spring 50' of assembly 16' is in contact with a substantially flat surface 52 on grid 16. Also, each backup spring 54 on grid 16 is opposite a substantially flat surface 52' on grid 16', although not in contact therewith under the conditions illustrated in FIG. 2.

In the illustrated embodiment, the nominal projection $P_1$ of the primary spring 50 from the outer surface 42 of grid 16 is about 0.050 inch (0.127 cm) in the cold condition and accordingly when the assemblies are packed into the reactor core the primary spring 50 will be displaced, or loaded by a force corresponding to approximately 0.005 inch (0.013 cm) deflection. With a grid having a $16 \times 16$ fuel array, preferably seven such primary springs 50 are provided on each perimeter plate 26 in alternation with the flat area 52 through which the tabs 38 project internally of the grid 16. Therefore a total of seven primary springs are in contact at each fuel assembly interface.

It may also be seen that, taking the juncture 28 as the point of origin A on grid 16, the perimeter plate extending from A–B has a primary spring 50a located on the plate outer surface corresponding to the second fuel rod position from the point of origin A. Along the direction A–C, however, the primary spring 50b is located on the outer surface of the grid corresponding to the third fuel position from the point of origin. Optionally, a primary spring could be provided in the first location in direction A–C, for a total of eight per perimeter plate. Generally, the number of anti-bowing springs on a grid is approximately half the number of outer fuel locations bordering the perimeter plates 26.

The outer surface 42' of assembly 16', when viewed from assembly 16 along direction A–C, has the first primary spring 50'c located in the same position relative to the point 28' as primary spring 50a is relative to origin 28. By locating the primary springs 50, 50' in accordance with the alternating pattern as described, adjacent fuel assemblies 10, 10' can be oriented so that the primary springs on the grid 16 will be opposite flat surfaces 52' on grid 16', and conversely.

FIGS. 3 and 4 show in greater detail an elevation view of the portion of the grid 16 corresponding to a portion B–D of perimeter plate 26 as observed along sight line 3 of FIG. 2. Beginning near B, a bent tab 38 is integrally formed to project inwardly through the plane of the paper and is adapted to engage a fuel rod within the grid. The grid structure corresponding to the next fuel rod location includes a vertically separated pair of arches 36, vertically separated dimples 60, and primary and backup anti-bowing springs, 50 and 54 respectively, which form the basis for the present invention. The arches 36 are integrally formed to project into the plane of the drawing to provide stop surfaces for the fuel rods (not shown). The optional dimples are slight indentations which may be employed to strengthen the grid in the vicinity of the arches and the anti-bowing spring. The primary spring 50 is integrally formed from the perimeter plate 26, generally plateau-like arch with horizontally crowned transverse sides 58 and bevelled or vertically crowned ends 56. The primary spring 50 is separated along its sides from the perimeter plate 26, forming slits 62 there between. Along the slits 62, the perimeter plate 26 is also slightly deformed to provide backup springs 54 parallel to and projection less than the primary spring 50.

It should be appreciated that the surface of the perimeter plate 26 in the area 52 immediately above and below the spring tab 38 is substantially flat and that, as shown in FIG. 2, the primary spring 50 of one grid will bear upon the substantially flat surface 52' of the adjacent, oppositely disposed grid. Furthermore, it should be appreciated that the crowned shape 56, 58 of the primary spring is the preferred structure which maximizes contact area during operation, yet minimizes the possibility of one assembly hanging up on the primary springs of another assembly during a refueling when assemblies must be relocated in the reactor core. Furthermore, the horizontal crown 58 minimizes the possibility that projecting structures on adjacent assemblies will lock into the primary springs 50. The pattern of providing a substantially flat surface 52 alternating with a primary spring 50 is repeated around the perimeter of the fuel assembly and on adjacent fuel assemblies, as illustrated in FIG. 2.

Referring again to FIG. 2, it should be evident that, if every fuel assembly is bordered by an adjacent assembly having an interaction of primary springs 50 and flat surfaces 52 repeated several times along each perimeter plate 26 of every assembly, the resistance to bowing of any single assembly is considerable. In this embodiment, the anti-bowing forces provided by the primary springs 50 are approximately the same at every spring location along the perimeter plate 26. The anti-bowing force is a function of the primary spring deflection and increases as the tendency to bow increases. In the event the bowing forces are so powerful that the primary springs 50 are overcome, the backup springs 54 interact with the flat surface 52. These springs are stiffer and, although some bowing will have occurred by the time the backup springs are engaged, these springs nevertheless substantially reduce the potential bowing that would otherwise occur with conventional grids.

The primary springs 50 are most likely to be overpowered, if at all, late in the life of each fuel assembly, after it has been irradiated a considerable period of time. With assemblies having Zircaloy grids, the primary springs, being integrally formed therefrom, will experience radiation induced creep and relaxation and therefore provide less anti-bowing force for a given degree of deflection against the opposing flat surface. The primary springs 50 should not be too stiff since this would make initial fuel loading extremely difficult, particularly in the preferred embodiment where the primary springs are slightly loaded, even on fresh assemblies, from the moment they are first inserted into the reactor core adjacent other assemblies. The core loading and refueling operation must not be endangered by assemblies that cannot be moved or relocated relative to one another at any time during the life of the reactor.

An alternative embodiment of the invention is shown in FIGS. 5 and 6. Two types of anti-bowing springs are provided on each perimeter plate 26. The primary spring 70 may be identical to spring 50 described in connection with FIGS. 3 and 4, or it may be slightly narrower and thus slightyly softer. Secondary anti-bowing springs 72 are also provided, having a stiffer spring constant but projecting a shorter distance from the perimeter plate 26. As with the embodiment illustrated in FIGS. 3 and 4, the anti-bowing springs 70 and 72 are provided with backup springs 74 substantially identical to the backup springs 54 described hereinabove.

FIG. 6 is a section of FIG. 5 along the line 6—6, which cuts the secondary spring 72 along its center, revealing the formation of the arch 76 corresponding to the arch 36 in FIGS. 3 and 4. The projection P2 is preferably about 0.040 inches (0.102 cm), which is less than the nominal cold gap between adjacent assemblies and less than the 0.050 inch projection P1 of the primary spring 70.

Figure 7:
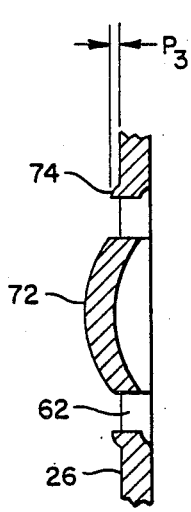
FIG. 7 is a section of the secondary spring along line 7—7 of FIG. 6, showing the horizontal crowning.

FIG. 7 is a section taken along lines 7—7 of FIG. 6 showing the preferred relationship of the secondary spring 72 (or primary spring 70 or 50) with respect to the perimeter plate 26 and backup spring 74 (or 54). In the illustrated embodiment the projection P3 of the backup spring 74 is about 0.010 inch (0.025 cm).

Figure 8:
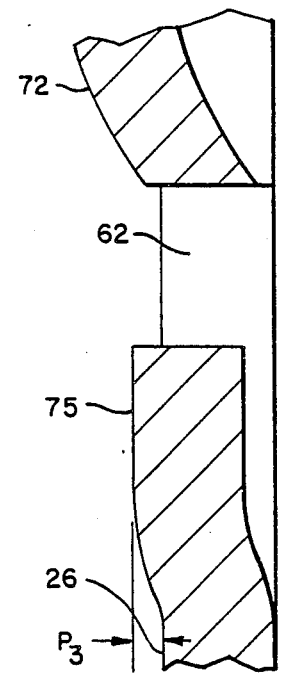
FIG. 8 is an enlarged, detailed view of a backup spring projecting from the grid plate.

FIG. 8 is a more detailed view of an alternative backup spring 75, illustrating that the projection need not be sharp, so long as the backup spring surface protrudes the appropriate distance P3 from the perimeter plate 26.

Figure 9:
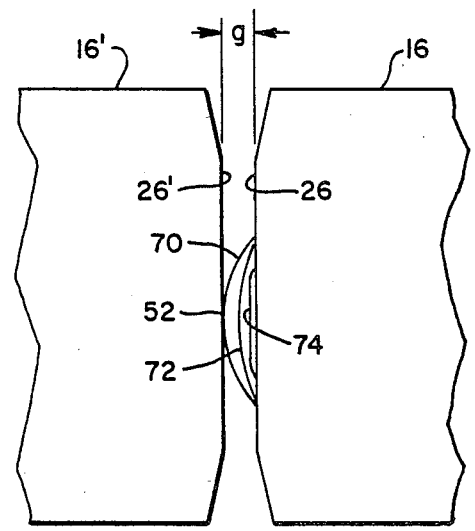
FIG. 9 is a schematic elevation view of two oppositely facing grids on adjacent assemblies according to the embodiment of the invention shown in FIG. 5, illustrating the different projections of the primary, secondary, and backup springs.

FIG. 9 shows schematically the interaction between two adjacent center grids 16, 16' of the type having both primary 70 and secondary 72 anti-bowing springs. Assuming that each of the assemblies is fresh, i.e., has not yet been burned in the reactor core, the gap g between opposite perimeter plates 26, 26' is 0.045 inch (0.113 cm). In the preferred embodiment of the invention, only the midplane grid 16 carries the anti-bowing springs 70, 72, and backup springs 74. As may be visualized from FIGS. 1 and 2 during insertion of an assembly 10 into the core, the midplane grid 16 passes downward along each of the upper grids above the midplane grid 16' of the neighboring assembly. The primary springs 70 will interact with the flat surfaces of each of the upper grids until the two assemblies are properly aligned within the core with the respective midplane grids 16, 16' opposed. Thus, the primary spring 70, which nominally projects 0.050 inch (0.127 cm), deflecteds slightly as it comes into contact with each of the upper grids on the neighboring assembly and remains deflected 0.005 inch (0.013 cm) as the assembly comes to rest with the center grids 16, 16' in opposition. It should be understood that, if additional anti-bowing measures are needed, one or more other grids near the assembly midplane may also be of the type described above.

In order to assure easy insertion of the adjacent assemblies, the spring rate for the primary spring 50, in the embodiment (FIG. 2) having seven primary springs 50 and no secondary springs on each perimeter plate 26, is preferably about 2000 pounds per inch ($3.5 \times 10^5$ N/m) deflection at the point of contact. With the embodiment illustrated in FIGS. 5 and 6, the primary spring 70 can be somewhat softer, having a spring rate of about 1200 to 1500 pounds per inch ($2.1–2.6 \times 10^5$ N/m). In the embodiment shown in FIGS. 5 and 6, each perimeter plate 26 has approximately an equal number of primary 70 and secondary 72 springs, with the secondary springs having a nominal projection of 0.040 inch (0.10 cm), which provides a clearance from the opposite flat surface of about 0.005 inch (0.013 cm).

Referring again to FIG. 9, after the fuel assemblies are in place, and as the reactor core is heated, the nominal gap increases. Because of lateral flow forces, slight bowing may begin immediately, tending to close the gap and maintain contact between the primary spring 70 and the opposite flat surface 52'. As the fuel assemblies are irradiated, the grids and other members grow, tending to decrease the gap g, which would normally inhibit bowing. However, the spring 70 is also undergoing creep through the effect of irradiation on stressed Zircaloy. Thus, the effectiveness of spring 70 may not in some cases be sufficient to resist the bowing forces. As the gap g closes the secondary spring 72 contacts the opposite flat surface 52' and provides a substantial resistance to further bowing. The characteristic of spring 72 is not changed early in the cycle because it is not initially stressed and therefore does not relax substantially as a result of irradiation.

At the end of a burnup cycle, when the assemblies must be removed, the core is cooled to ambient temperatures and the spacing between fuel assemblies is reduced thereby increasing spring deflection. Even though contact of the primary springs 70 may exist, no great effort is required to remove fuel assemblies because of the flexibility of the springs.

In the embodiment represented in FIG. 9, which has the relatively weak primary springs 70 and the stiffer secondary spring 72, it is not believed that the very stiff backup spring 74 will ever make contact with the opposite flat surface 52', (except under a seismic event) since the secondary spring 72 is sufficient to resist the bowing forces. The backup springs 74 are preferably retained, however, as structure for limiting the lateral motion of the fuel assemblies in the event of a severe seismic disturbance. The backup spring 74 helps reduce the accumulated impact load that may be felt at one side of the nuclear reactor core should a seismic disturbance propel the midplanes of all assemblies in a single direction. Thus, the total available gap accumulated over the midplane of all assemblies is effectively reduced and this reduces the momentum of the core with a concomitant reduction in the impact on peripheral assemblies during an earthquake.

In the embodiment illustrated in FIGS. 3 and 4, which have only a primary spring 50, the backup spring 54 is more likely to contact the opposing flat surface 52 and act as an anti-bowing spring of last resort, especially for very severe bowing forces.

What is claimed is:

1. In the combination of two elongated nuclear fuel assemblies of the type having a plurality of longitudinally spaced apart grids supporting a regular array of elongated fuel rods, each grid including a plurality of substantially flat, rigid perimeter plates circumscribing the fuel rods and defining a polygonal assembly cross section, the assemblies further being supported in parallel side by side relationship such that an arbitrary first perimeter plate of one assembly is co-extensive and opposite an arbitrary second perimeter plate of another assembly whereby a predetermined nominal gap is provided therebetween, the improvement comprising:

said first and second perimeter plates each having a plurality of crowned anti-bowing springs integrally formed thereon and projecting outwardly therefrom, said anti-bowing springs being laterally separated in periodic alternation with substantially flat portions of the outer surface of the plate such that each spring on the first perimeter plate is opposite a flat surface on the second plate, and conversely, each spring on the second plate is opposite a flat surface on the first plate, said plurality of crowned anti-bowing springs on each perimeter plate consisting of horizontally alternating primary and secondary springs, the primary springs having a greater projection and less stiffness than the secondary springs.

2. The combination of fuel assemblies as recited in claim 1 wherein each anti-bowing spring has associated therewith, a backup spring integrally formed from the perimeter plate and projecting from the plate a distance less than the projection of said anti-bowing spring, the backup spring being stiffer than the anti-bowing spring.

3. The combination of fuel assemblies as recited in claim 1 wherein each anti-bowing spring is in the form of a vertically elongated, plateau-like arch.

4. The combination of fuel assemblies as recited in claim 3 wherein each arch is crowned vertically and horizontally.

5. The combination of fuel assemblies as recited in claim 3 wherein the perimeter plate is made of Zircaloy and the stiffness of each anti-bowing spring is about 2,000 pounds per inch in the unloaded, unirradiated condition.

6. The combination of fuel assemblies as recited in claim 5 wherein the projection of the anti-bowing springs is about 0.05 inch.

7. The combination of assemblies as recited in claim 6 wherein the total number of anti-bowing springs on each grid is approximately half the number of fuel rods bordering the inside surfaces of all the perimeter plates.

8. The combination of fuel assemblies as recited in claim 7 wherein the nominal gap is about 0.045 inch.

9. The combination of assemblies as recited in claim 3 wherein the total number anti-bowing springs on each grid is approximately half the number of fuel rods bordering the inside surfaces of all the perimeter plates in the grid.

10. The combination of assemblies as recited in claim 3, wherein the portion of the perimeter plate along side each anti-bowing spring has a vertical slit therein, with one edge of the slit being bent to project outwardly from the perimeter plate to form said backup spring.

* * * * *